United States Patent
Nomura et al.

[11] Patent Number: 6,088,160
[45] Date of Patent: Jul. 11, 2000

[54] DIFFRACTIVE OPTICAL ELEMENT

[75] Inventors: Yoshimitsu Nomura; Masaaki Fukuda; Takashi Ito; Kaneyoshi Yagi, all of Saitama, Japan

[73] Assignee: Fuji Photo Optical Co., Ltd., Saitama, Japan

[21] Appl. No.: 09/161,744

[22] Filed: Sep. 29, 1998

[30] Foreign Application Priority Data

Oct. 3, 1997 [JP] Japan ............................... 9-271261

[51] Int. Cl.⁷ ............................... G02B 7/02; G02B 5/18
[52] U.S. Cl. ............................... 359/566; 359/819
[58] Field of Search ............................... 359/819, 831, 359/871, 566

[56] References Cited

U.S. PATENT DOCUMENTS 5,024,509  6/1991  Kurihara .................. 359/819
5,608,579  3/1997  Nomura .................... 359/819

*Primary Examiner*—Cassandra Spyrou
*Assistant Examiner*—Jennifer Winstedt
*Attorney, Agent, or Firm*—Leydig, Voit & Mayer, Ltd.

[57] ABSTRACT

A diffractive optical element includes an optically functioning part including a diffraction grating and a flange part disposed around the optically functioning part. On an outer circumferential face of the flange part, there are at least three protrusions at respective different locations. The protrusions project outward from the outer circumferential face.

9 Claims, 4 Drawing Sheets

DIFFRACTIVE OPTICAL ELEMENT

BACKGROUND OF THE INVENTION

1. Field of the Invention

The present invention relates to a diffractive optical element used for various kind of optical instruments.

2. Related Background Art

A diffractive optical element for diffracting light emitted from a light source such as a laser diode or the like and splitting it into a main beam and a sub-beam has conventionally been attached to an optical pickup incorporated in a CD/DVD reproducing apparatus or the like. FIG. 5 shows a conventional diffractive optical element. The diffractive optical element 101 shown in FIG. 5 is made by injection-molding a resin such as acrylics and has an outside diameter of about 4 to 5 mm. As depicted in this drawing, the center part of the diffractive optical element 101 is formed with an optically functioning part 103 having a diffraction grating 102. Around the optically functioning part 103, a flange part 104 is formed. The outer circumferential face 105 of the flange part 104 is formed like a cylindrical surface.

The diffractive optical element 101 is attached to a holder section 110 formed in an optical pickup or the like. In this case, the diffractive optical element 101 is inserted into an attachment hole 110a incorporated in the holder section 110 and is secured thereto with a coned disc spring or the like in a state where the diffraction grating 102 is oriented to a predetermined direction. When attaching the diffractive optical element 101 to the holder section 110, it is necessary to prevent the diffractive optical element 101 from shifting its position. Therefore, the gap between the outer circumferential face 105 of the flange part 104 and the inner circumferential face of the attachment hole 110a of the holder section 110 should be as small as possible.

SUMMARY OF THE INVENTION

It is an object of the present invention to provide a diffractive optical element which has a favorable attachability and can efficiently be manufactured at a low cost.

The diffractive optical element in accordance with the present invention comprises an optically functioning part having a diffraction grating; a flange part formed around the optically functioning part; and at least three protrusions projecting outward from the outer circumferential face. The protrusions are formed at different locations in an outer circumferential face of the flange part.

When the conventional diffractive optical element 101 is attached to the holder section 110, as shown in FIG. 5, there is the case where the outside diameter of the flange part 104 is much smaller than the inside diameter of the attachment hole 110a. In the case that the gap between the diffractive optical element 101 and the attachment hole 110a becomes greater, the diffractive optical element 101 may shift its position. When such a positional shift occurs, the optical pickup may deteriorate its performances. In the case where the outside diameter of the flange part 104 is greater than the inside diameter of the attachment hole 110a, by contrast, the diffractive optical element 101 cannot be inserted into the attachment hole 110a. Thus, the conventional diffractive optical element has been problematic in terms of attachability.

In order for the outside diameter of the flange part 104 to substantially coincide with the inside diameter of the attachment hole 110a, it is necessary to set the tolerance of the outer circumferential face 105 to a value as small as possible, when making the diffractive optical element 101. In a diffractive optical element having an outside diameter of about 4 to 5 mm, for example, a tolerance of about 0.01 to 0.03 mm is required to be set. Here, in the case where the outside diameter of the outer circumferential face 105 is smaller than the inside diameter of the attachment hole 110a, it is necessary to modify a die as a whole until a predetermined tolerance is satisfied. In the case where the outside diameter of the outer circumferential face 105 is greater than the inside diameter of the attachment hole 110a, on the other hand, it is necessary to make a new die. In either case, the conventional diffractive optical element has been problematic in that it is likely to increase manufacturing cost, while its manufacturing efficiency is low.

In the case where the diffractive optical element in accordance with the present invention is attached to a holder section incorporated in an optical pickup or the like, by contrast, at least three protrusions formed at different locations in the outer circumferential face come into contact with the inner side face (inner circumferential face) of the holder section. As a consequence, the diffractive optical element is held by at least three contacting portions in the holder section. Hence, the diffractive optical element is correctly positioned in the holder section without rattling.

Even when it becomes necessary to modify the die for accurately attaching the diffractive optical element to the holder section, the protrusion-forming part of the die can be modified alone without requiring any modification of its part for forming the outer circumferential face. Consequently, the cost and time for modifying the die can be reduced, whereby the manufacturing cost of the diffractive optical element is lowered as a whole, while its manufacturing efficiency is improved.

Further, since only the protrusions in the diffractive optical element come into contact with the inner side face of the holder section, a space is defined between the outer circumferential face of the diffractive optical element and the inner side face of the holder section. This space functions as a buffer, thereby acting to alleviate influences of heat and the like on the diffractive optical element. As a consequence, optical performances of the diffractive optical element can be maintained in a favorable state.

Preferably, each protrusion has substantially a triangular pyramid shape. Namely, the protrusion is preferably tapered down to the lower end (toward the tip side to be inserted into the holder section). In the case where such a configuration is employed, the diffractive optical element can be secured to the holder section when pushed into the latter. The protrusion may have a semi-conical shape as well.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the diffractive optical element in accordance with the present invention will be explained in detail with reference to the accompanying drawings.

Figure 1:
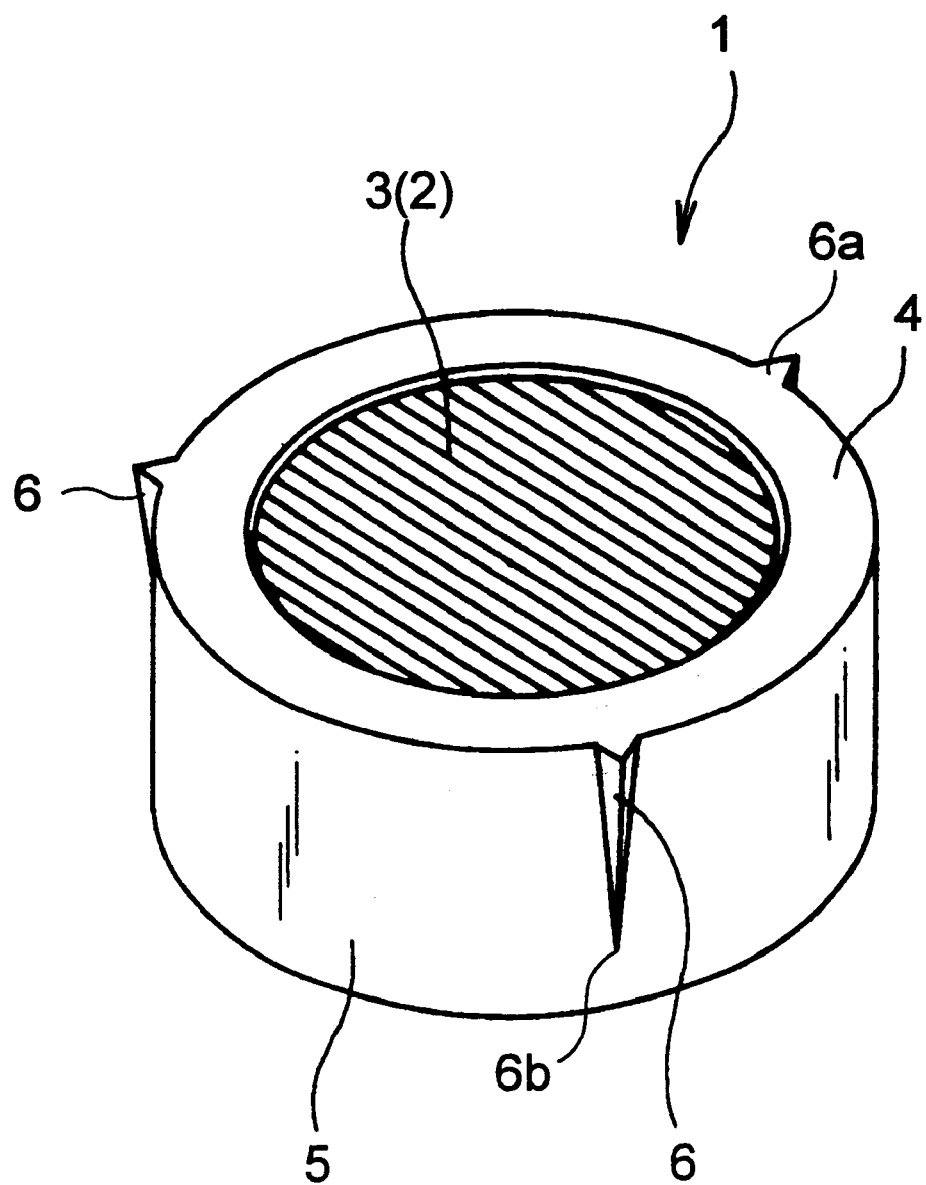
FIG. 1 is a perspective view showing a diffractive optical element in accordance with the present invention.

FIG. 1 is a perspective view showing a diffractive optical element in accordance with the present invention. The diffractive optical element 1 shown in this drawing is made by injection molding, transfer molding, or the like using a plastic resin such as acrylics, polystyrene, polycarbonate, amorphous polyolefine, or the like. The diffractive optical element 1 has an outside diameter of about 4 to 5 mm. The diffractive optical element 1 is mainly aimed at attaching to an optical pickup (not shown) incorporated in a CD/DVD reproducing apparatus or the like. As shown in FIG. 1, the center part of the diffractive optical element 1 is formed with an optically functioning part 3 having a diffraction grating 2. The diffraction grating 2 comprises minute irregularities formed on the upper and lower faces of the diffractive optical element 1, and diffracts light emitted from a light source such as a laser diode (not shown) or the like, so as to split it into a main beam and a sub-beam.

Figure 2:
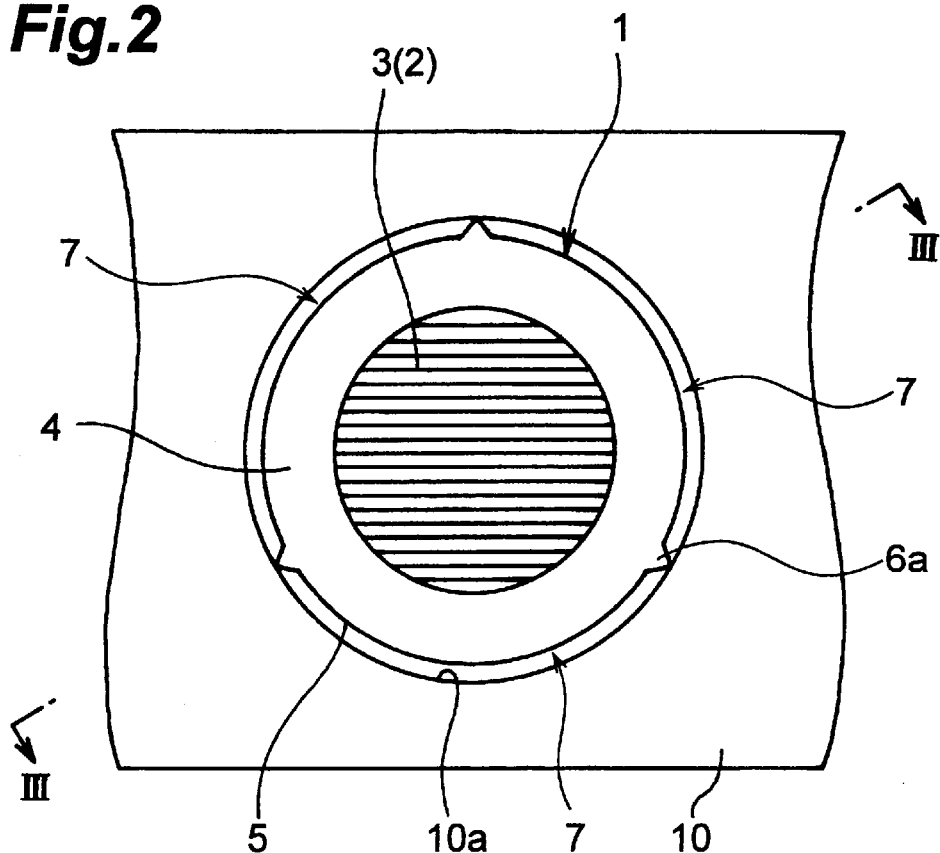
FIG. 2 is a plan view showing a state where the diffractive optical element of FIG. 1 is attached to a holder section.
Figure 3:
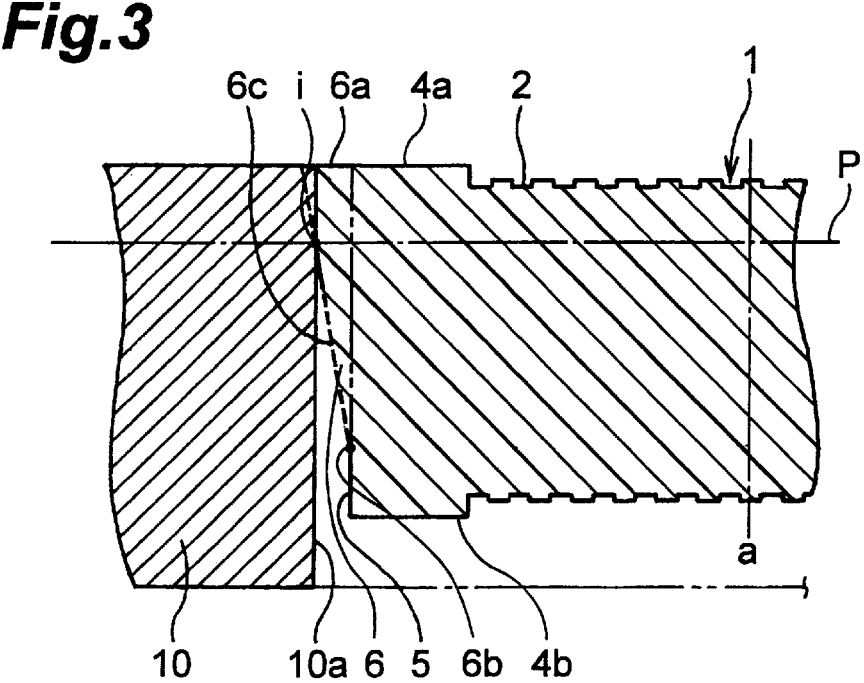
FIG. 3 is a sectional view taken along the line III—III in FIG. 2, showing major parts at a greater magnification.

Around the optically functioning part 3, a flange part 4 is formed. The upper face 4a and lower face 4b of the flange part 4 are made flat as shown in FIG. 3. The flange part 4 functions as a so-called reference surface when the diffractive optical element 1 is being attached to a holder section 10 incorporated in an optical pickup (see FIG. 2). The outer circumferential face 5 of the flange part 4 is formed as a cylindrical surface.

Disposed at three different locations in the outer circumferential face 5 are protrusions 6 projecting outward therefrom. The protrusions 6 are formed at equally spaced intervals. In this diffractive optical element 1, the protrusions 6 are located at 120° intervals about the center. When the diffractive optical element 1 is attached to the holder section 10, the protrusions 6 formed at three different locations of the outer circumferential face 5 would come into contact with the inner side face (inner circumferential face) of the attachment hole 10a as shown in FIG. 2. As a consequence, the diffractive optical element 1 is held by three contacting portions in the holder section 10. Hence, the diffractive optical element 1 is correctly positioned in the holder section 10 without rattling, whereby the attachability of the diffractive optical element 1 would be improved.

Each protrusion 6 has substantially a triangular pyramid shape. Each protrusion 6 is formed on the outer circumferential face 5 such that the bottom face 6a of the triangular pyramid is flush with the upper face 4a of the flange part 4, whereas the apex 6b is positioned on the lower face 4b side of the flange part 4. When the diffractive optical element 1 is cut along a plane orthogonal to the center axis (a), a triangle connecting the points of intersection of this plane and the respective ridges 6c of the protrusions 6 becomes a regular triangle. In this diffractive optical element 1, as shown in FIG. 3, the diameter of a circle circumscribing a regular triangle which connects points of intersection (i) of a plane P and the respective ridges 6c of the protrusions 6 coincides with the inside diameter of the attachment hole 10a. The plane P is orthogonal to the center axis (a) and passes through a predetermined position lower than the upper face 4a of the flange part 4 (e.g., the position lower than the upper face 4a of the flange part 4 by about ¼ of the height of the diffractive optical element 1). On the upper side of this plane P, the distance between the ridge 6c of each protrusion 6 and the center axis (a) is slightly longer than the radius of the attachment hole 10a. The height (vertical length) of the protrusion 6 is shorter than the height of the diffractive optical element 1, whereby the apex 6b of the protrusion 6 is positioned higher than the lower face of the flange part 4 (see FIG. 1).

When the diffractive optical element 1 is straightly pushed into the attachment hole 10a, the upper part of each protrusion 6 elastically deforms as indicated by the dotted line in FIG. 3. As a consequence, the diffractive optical element 1 can be secured to the holder section 10. Practically favorable results would be obtained when a pressure of 20 to 200 gf is used for inserting the diffractive optical element 1 into the attachment hole 10a. In this case, a coned disc spring or the like for securing the diffractive optical element 1 to the holder section 10 can be omitted. Also, since each protrusion 6 is tapered down to the lower end, the diffractive optical element 1 can easily be inserted into the attachment hole 10a.

When the diffractive optical element 1 is attached to the holder section 10, only the protrusions 6 formed at three different locations of the outer circumferential face 5 come into contact with the inner side face (inner circumferential face) of the attachment hole 10a. Also, the outer circumferential face 5 of the diffractive optical element 1 does not directly come into contact with the inner side face of the attachment hole 10a. As a consequence, spaces 7 are formed between the outer circumferential face 5 of the diffractive optical element 1 and the inner side face of the attachment hole 10a (see FIG. 2). The spaces 7 defined between the diffractive optical element 1 and the attachment hole 10a function as a buffer. They can alleviate influences of heat and the like acting on the diffractive optical element 1.

Since the holder section 10 is made of die casting, heat-resistant plastics, or the like in general, the temperature thereof may rise when the optical pickup or the like is in use. Here, in the diffractive optical element 1, only the protrusions 6 formed in the diffractive optical element 1 come into contact with the inner side face of the attachment hole 10a. Consequently, as compared with the case where substantially the whole outer circumferential face 5 comes into contact with the inner side face of the attachment hole 10a, the heat quantity transmitted from the holder section 10 to the diffractive optical element 1 can be reduced. Hence, even when the optical pickup or the like is continuously used for a long period of time, the optical performances of the diffractive optical element 1 would be maintained in a favorable state.

While the diffractive optical element 1 is manufactured by injection molding or the like of plastics such as acrylics using an unshown die as mentioned above, there are cases where it is found necessary to modify the die after the completion of the diffractive optical element 1 for accurately attaching the diffractive optical element 1 to the holder section 10. In this case, since the diffractive optical element 1 is held in the holder section 10 by the protrusions 6, it is only necessary to modify the protrusion-forming part of the die, without requiring any modification of its part for forming the outer circumferential face. Consequently, the cost and time for modifying the die can be reduced. Hence, the manufacturing cost of the diffractive optical element 1 is lowered as a whole, while its manufacturing efficiency is improved.

Figure 4:
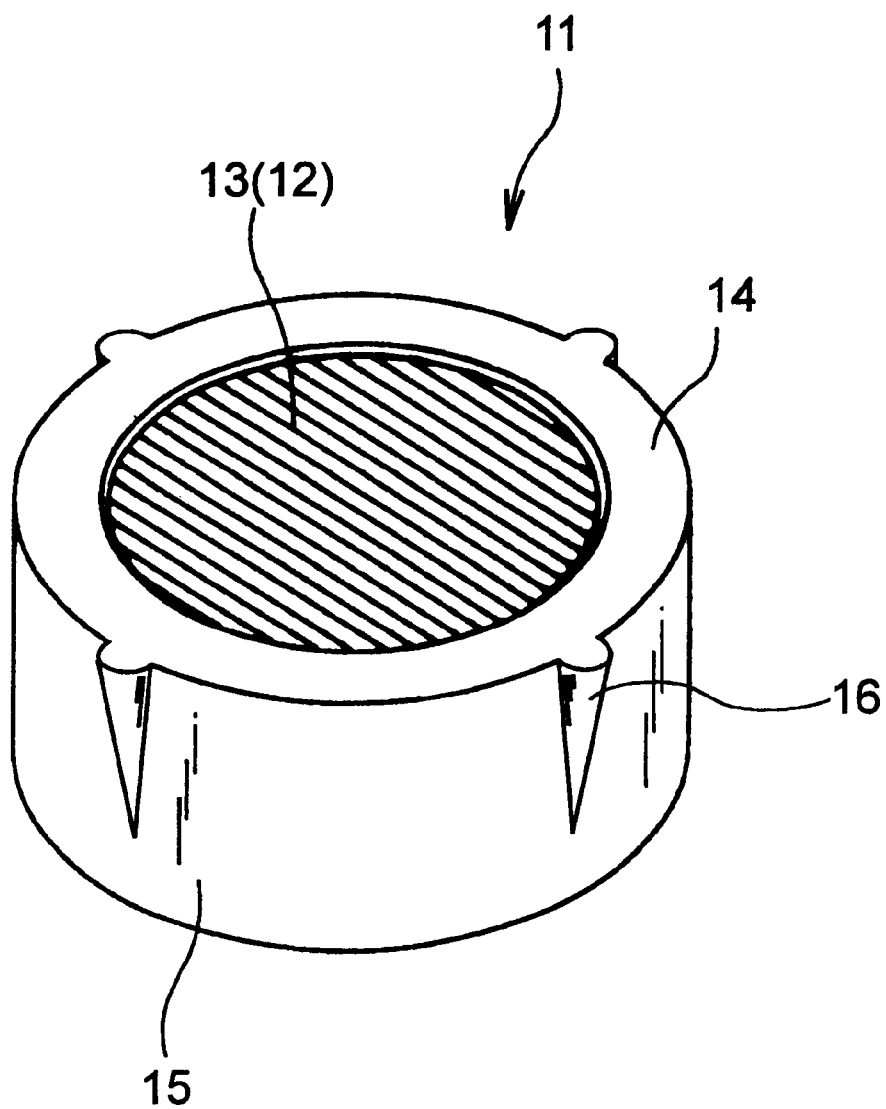
FIG. 4 is a perspective view showing another embodiment of the diffractive optical element in accordance with the present invention.
Figure 5:
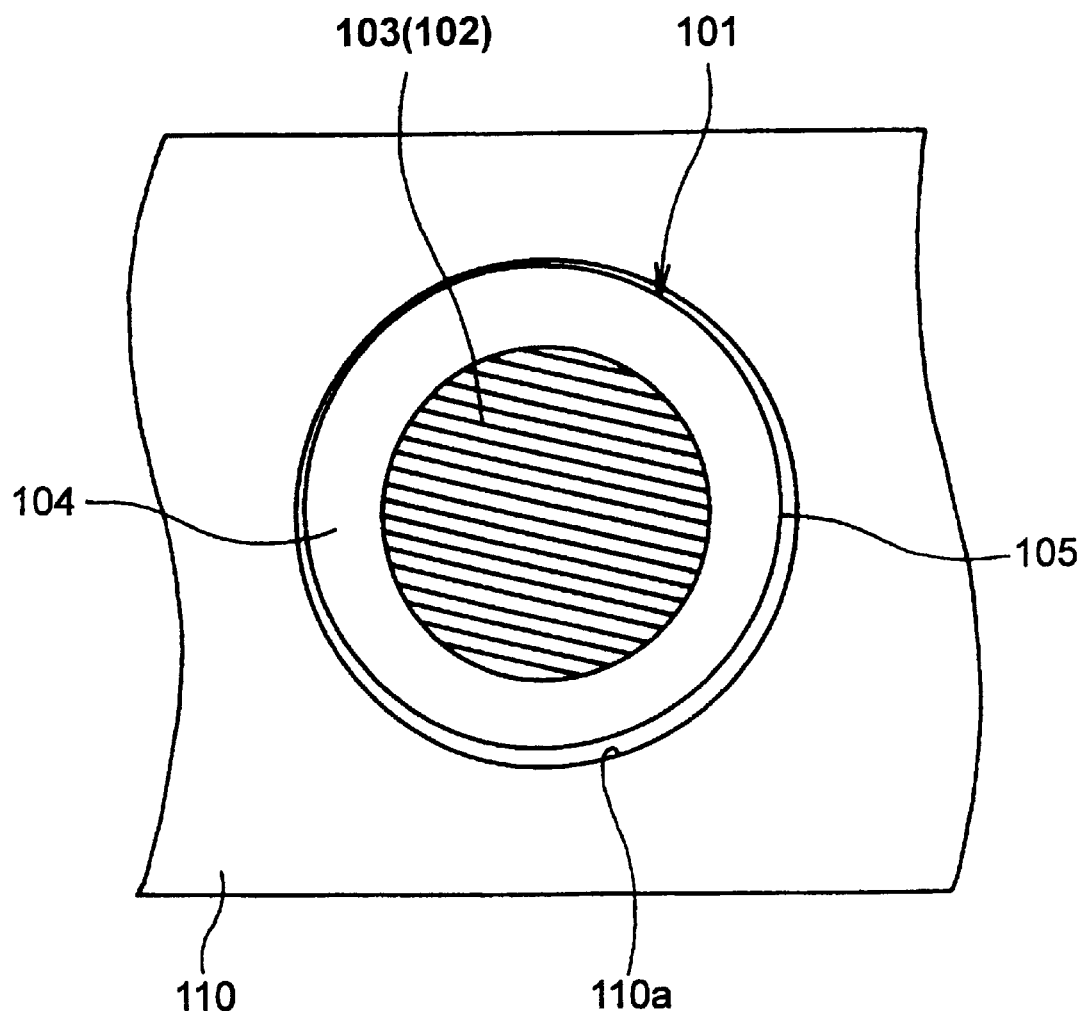
FIG. 5 is a plan view showing a state where a conventional diffractive optical element is attached to a holder section.

FIG. 4 is a perspective view showing a diffractive optical element in accordance with the present invention. The center part of the diffractive optical element 11 shown in FIG. 4 is formed with an optically functioning part 13 having a diffraction grating 12. Around the optically functioning part 13, a flange part 14 is formed. The upper and lower faces of the flange parts 14 are made flat. The flange part 14 functions as a so-called reference surface when the diffractive optical element 1 is being attached to an optical pickup (see FIG. 2). The outer circumferential face 15 of the flange part 14 is formed as a cylindrical surface. Disposed at four different locations in the outer circumferential face 15 are protrusions 16 projecting outward therefrom. The protrusions 16 are located at 90° intervals about the center. Each protrusion 6 has substantially a semi-conical shape.

As with the diffractive optical element 11, protrusions may be disposed at four, six, or more different locations in the outer circumferential face 15. Also, practically favorable results would also be obtained when protrusions each having substantially a semi-conical shape are provided as with the diffractive optical element 11.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A diffractive optical element comprising:

an optically functioning part having a diffraction grating;

a flange part surrounding said optically functioning part, said flange part having a first upper face, a second face opposite said first face, and an outer circumferential face extending between said first and second faces; and at least three protrusions located at respective different locations on said outer circumferential face of said flange part, projecting outwardly from said outer circumferential face, each of said protrusions having a cross sectional area that decreases along a direction extending from said first face to said second face.

2. The diffractive optical element according to claim 1, wherein each of said protrusions has a triangular pyramidal shape.

3. The diffractive optical element according to claim 1, wherein each of said protrusions has a semi-conical shape.

4. The diffractive optical element according to claim 1, wherein each of said protrusions has a planar face and an apex, the planar face of each protrusion being flush with said first face and the apex of each protrusion being positioned between said first and second faces.

5. The diffractive optical element according to claim 2, wherein each of said protrusions has a planar face and an apex, the planar face of each protrusion being flush with said first face and the apex of each protrusion being positioned between said first and second faces.

6. The diffractive optical element according to claim 3, wherein each of said protrusions has a planar face and an apex, the planar face of each protrusion being flush with said first face and the apex of each protrusion being positioned between said first and second faces.

7. The diffractive optical element according to claim 1, wherein said flange part has a height between said first and second faces and each protrusion has a height less than the height of said flange part.

8. The diffractive optical element according to claim 2, wherein said flange part has a height between said first and second faces and each protrusion has a height less than the height of said flange part.

9. The diffractive optical element according to claim 3, wherein said flange part has a height between said first and second faces and each protrusion has a height less than the height of said flange part.

\* \* \* \* \*